May 20, 1958 P. A. SAARI 2,835,026
APPARATUS FOR ASSEMBLING LAMINATED ELECTROMAGNETIC DEVICES
Filed June 28, 1954 9 Sheets-Sheet 1

INVENTOR.
PAUL A. SAARI
BY George H. Fisher
ATTORNEY

May 20, 1958 P. A. SAARI 2,835,026
APPARATUS FOR ASSEMBLING LAMINATED ELECTROMAGNETIC DEVICES
Filed June 28, 1954 9 Sheets-Sheet 4

INVENTOR.
PAUL A. SAARI
BY George H. Fisher
ATTORNEY

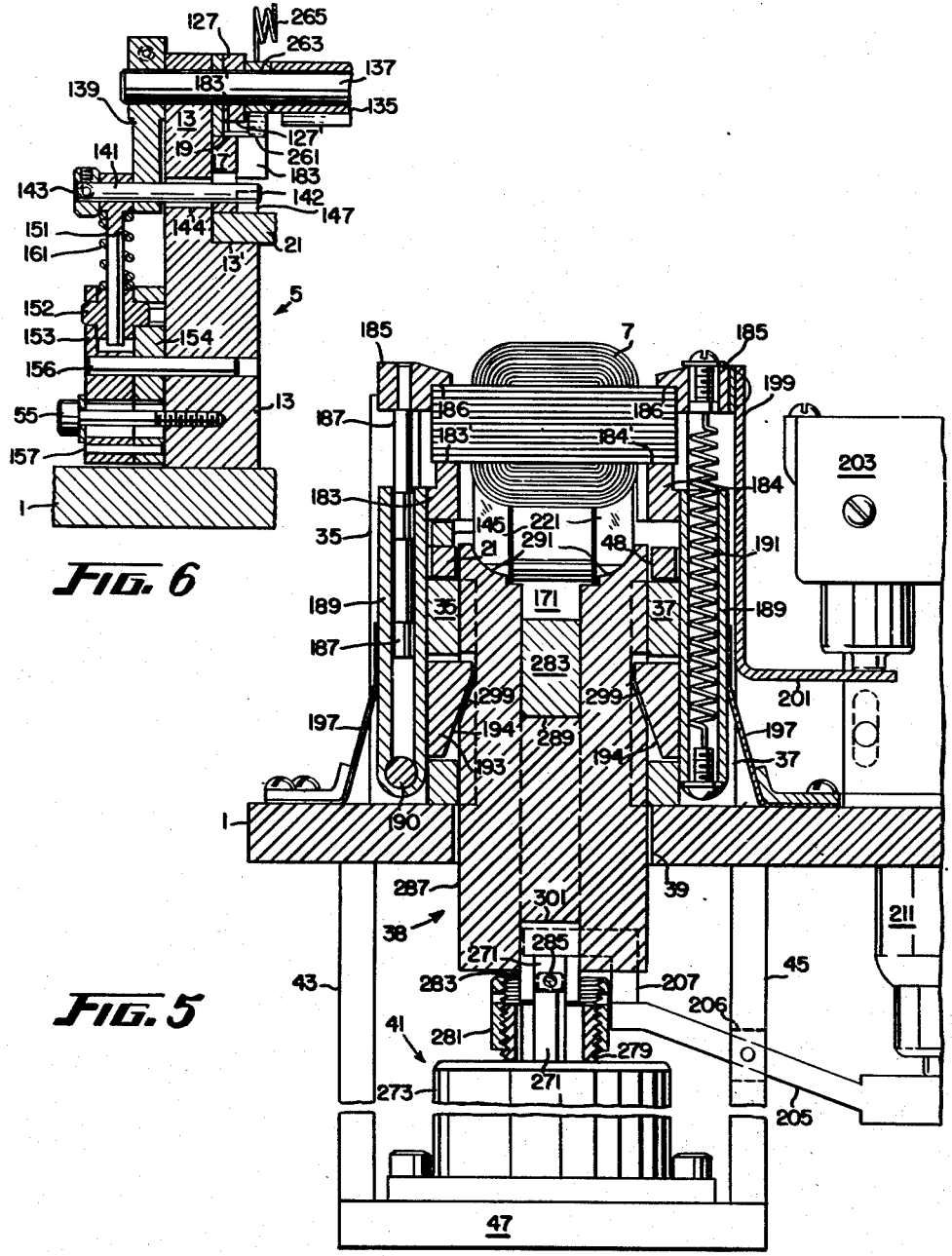

May 20, 1958 P. A. SAARI 2,835,026
APPARATUS FOR ASSEMBLING LAMINATED ELECTROMAGNETIC DEVICES
Filed June 28, 1954 9 Sheets-Sheet 6

INVENTOR
PAUL A. SAARI
BY George H. Fisher
ATTORNEY

May 20, 1958   P. A. SAARI   2,835,026
APPARATUS FOR ASSEMBLING LAMINATED ELECTROMAGNETIC DEVICES
Filed June 28, 1954   9 Sheets-Sheet 7
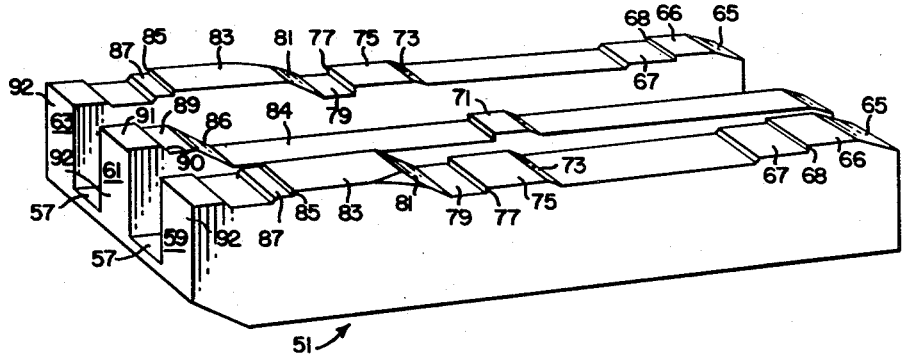
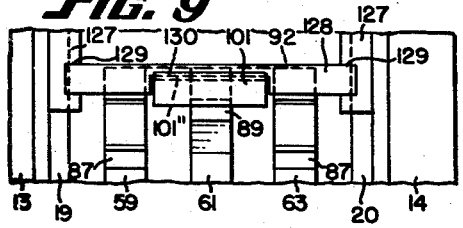
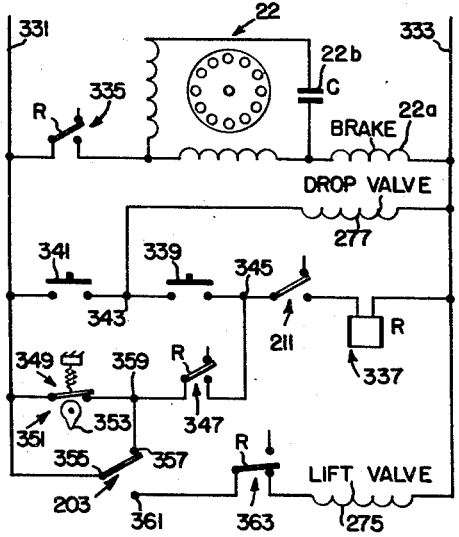
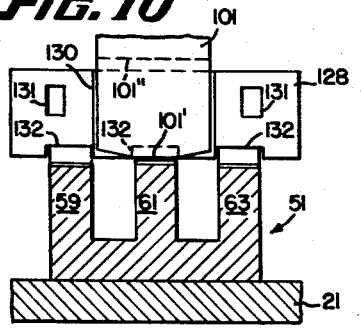
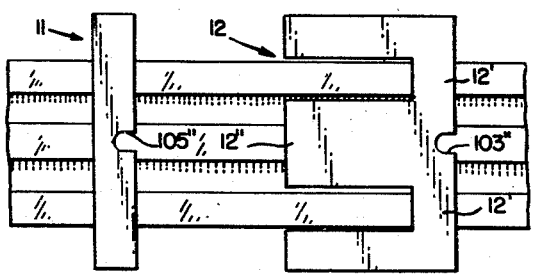
*INVENTOR.*
PAUL A. SAARI
BY George H Fisher
*ATTORNEY*

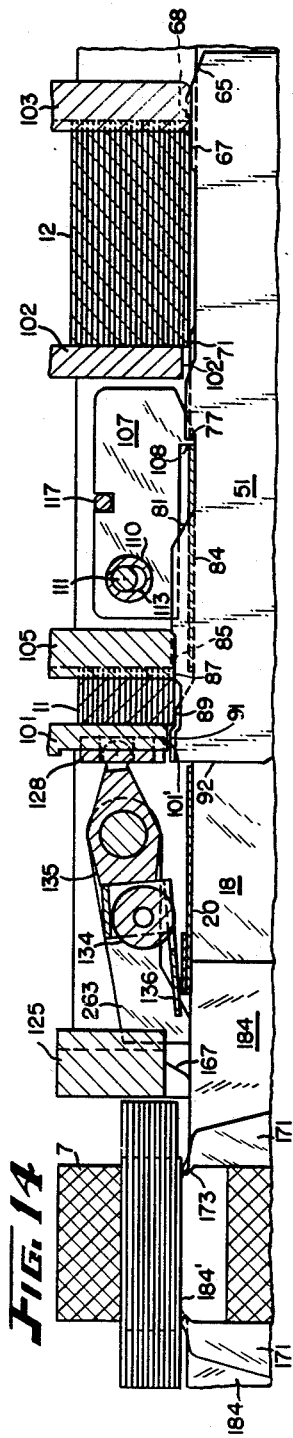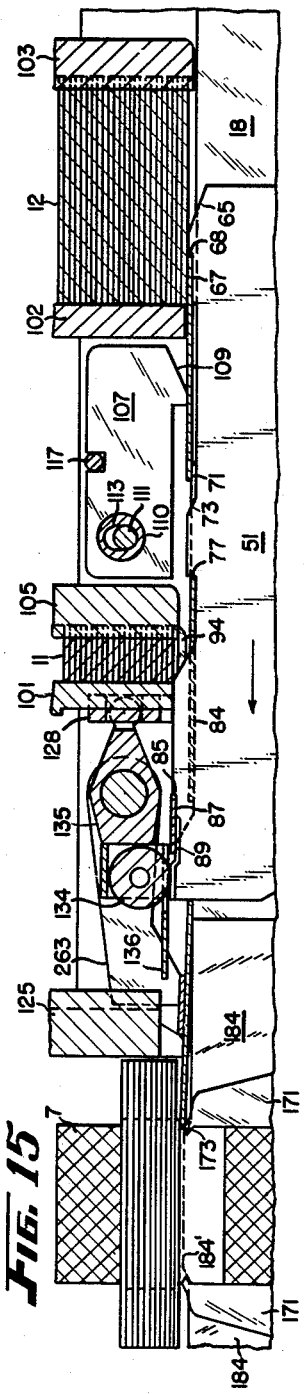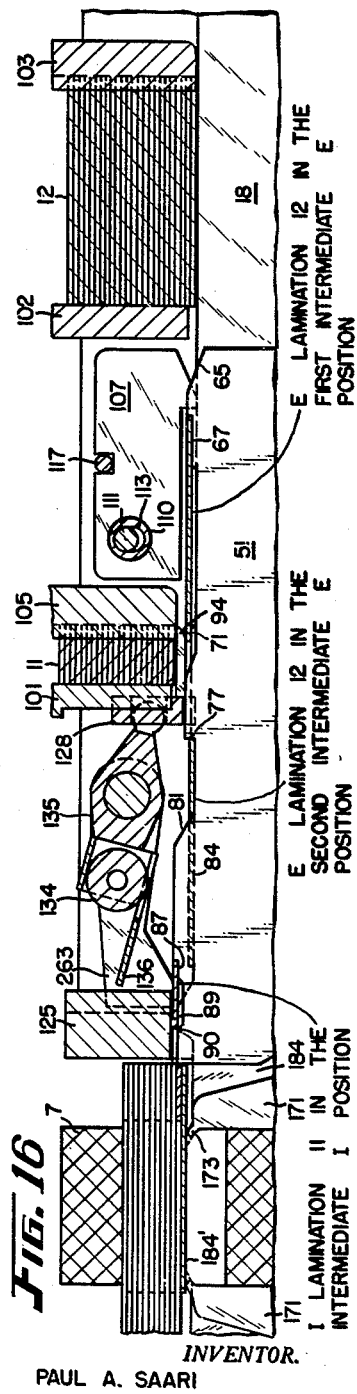

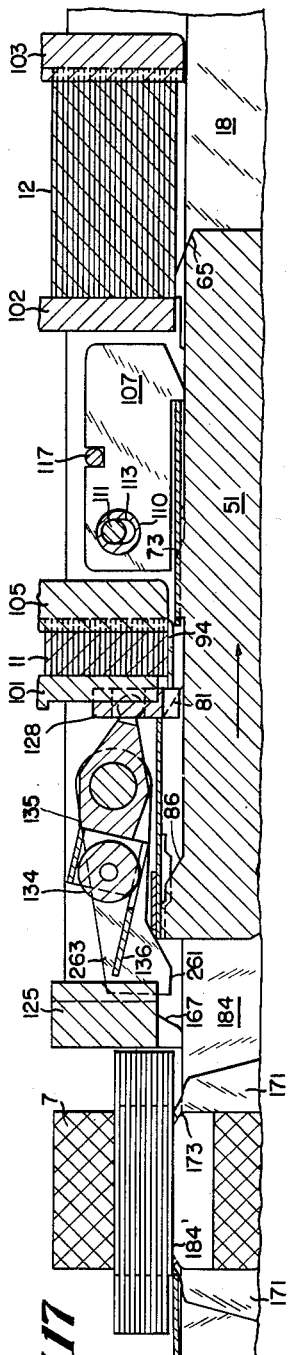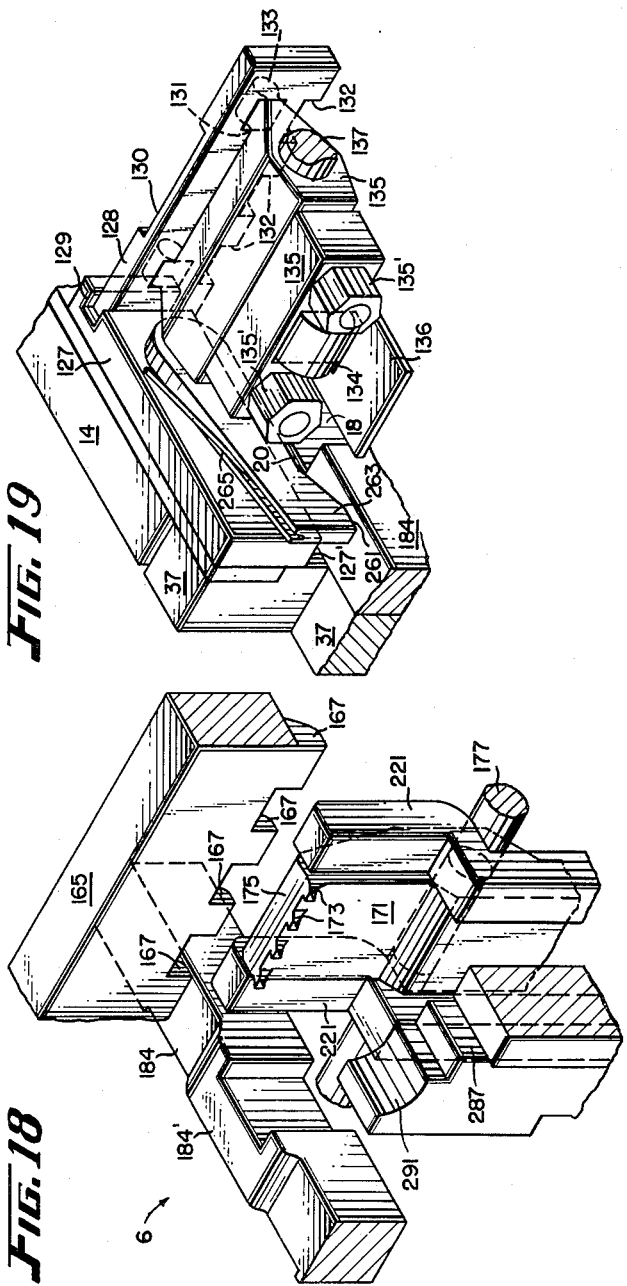

United States Patent Office 2,835,026
Patented May 20, 1958

2,835,026

APPARATUS FOR ASSEMBLING LAMINATED ELECTROMAGNETIC DEVICES

Paul A. Saari, Golden Valley, Minn., assignor to Minneapolis-Honeywell Regulator Company, Minneapolis, Minn., a corporation of Delaware Application June 28, 1954, Serial No. 439,810

12 Claims. (Cl. 29—203)

This invention is concerned with laminated electromagnetic induction apparatus such as transformers and the like and more specifically to an improved and novel method and means of assembling such devices.

The teaching of my invention will be set forth below as it is applied to the automatic assembly of E and I type transformers but it should be understood that the invention is not limited to any specific configuration or type of lamination.

One very serious problem in the automatic assembly of punched laminations is the jamming of the assembling machinery by bent and/or warped laminations. The deformity in the lamination may be caused by various factors such as by bends in the stock material, by the punching operation or by the heat treating of the punched laminations prior to the assembly thereof. The ideal lamination is perfectly flat so that it presents a straight edge surface to the gauging and transferring means. On the other hand, the deformed laminations generally present an edge surface to the gauging and transferring means that is not straight.

Prior methods and means for gauging and transferring laminations generally consist of supporting a stack of laminations on a single flat surface or the equivalent and then pushing the required number of laminations out of the stack, the number being determined by the relative difference in elevation between the flat supporting surface and one or more gauging surfaces. All of the prior art arrangements are more or less susceptible to jamming when a deformed lamination is gauged. The jamming can occur when one side or portion of the lamination being transferred passes under a gauging surface (or one of several gauging surfaces) but the remaining portion of the lamination gets hung up on the gauging member and does not pass.

One of the principal objects of the invention therefore is to provide an improved and novel method and means for supporting and gauging laminations whereby jamming caused by warped and/or bent laminations is eliminated.

Another object of the invention is to provide a lamination stacking machine wherein the lamination supporting means, transferring means, and gauging means are so related that a bent, warped, or otherwise distorted lamination will not jam the machine.

A further object is to provide a lamination stacking machine wherein a stack of laminations housed in a magazine is supported at the bottom thereof at three triangularly spaced areas or points and a single gauging member of a relatively small width as compared to the width of the laminations is positioned adjacent to the inboard edge of the stack and in line with one of said areas, said one of said areas also being adjacent to said edge, and the other areas being spaced away from said edge.

Still another object of the invention is to provide a novel method of assembling E and I type transformers wherein the laminations are transferred from a position below the magazines containing a supply of laminations to an assembly station containing a pre-wound coil, the E laminations being transferred in three steps and the I laminations being transferred in two steps by a reciprocating pickup member, the pickup member engaging the laminations and initiating each transfer movement while the relative velocity between the pickup member and the laminations is zero, thus precluding jamming of the apparatus by high speed impacts of the laminations by the pickup member.

The above and other objects relating to constructional details and to rapid and positive assembly of laminated electromagnetic apparatus as well as further objects will be apparent from the following detailed description thereof taken in conjunction with the drawings wherein:

Figure 5 is a cross-sectional view of the assembly station portion of the machine shown in Figures 1-4 as viewed along section line 5—5 on Figure 3;

Figure 6 is a cross-sectional view of the E hold-back plate operating mechanism and lamination hold-down means as viewed along section line 6—6 of Figure 3;

Figure 8 is an isometric view of a pickup member used on the machine;

Figures 9 and 10 are partial top and cross-sectional views respectively of the pickup member and the I gauging member, showing the relationship therebetween;

Figure 11 is a top view of the pickup member with an E and an I lamination superimposed thereover so as to show the relationship therebetween;

Figure 12 is a partial left end view of the machine as shown in Figure 2;

Figure 13 is a schematic wiring diagram for the apparatus;

Figures 14, 15, 16 and 17 are side views, partly in section, of one of the lamination pickup members, the lamination magazines associated therewith, the assembly station, and various lamination hold-down and hold-back members associated with the transfer of the laminations from their initial positions in the magazines to their final position in the assembly station. These figures show the above named elements at each significant stage of the assembly process;

Figure 18 is an isometric view of part of the assembly station; and

Figure 19 is an isometric view of the hold-back plate and associated operating mechanism.

In the method of assembling transformers to be described in greater detail below, I and E laminations 11 and 12 respectively (see Figure 11) are added layer by layer to a pre-wound coil 7. The E and I laminations will generally be stamped out of the same gauge of stock material and hence will be of the same thickness. Each layer is the reverse of the adjacent layers so that the I laminations 11 abut and bridge the ends of the legs of the E laminations. The coil member 7 is placed intermediate of two pairs of magazines containing laminations, each pair containing E and I laminations. First an E and an I lamination are brought to the coil from one side, the center leg of the E passing through the window in the coil and the I lamination resting on the yoke portions of the E lamination. Then an E and an I lamination (the I again resting on top of the E) are brought to the coil from the other side, the center leg of the second E lamination passing through the coil window and under the center leg of the first E lamination until the edge of the I lamination resting upon the second E lamination abuts against the edges of the ends of the legs of the first E lamination. This process continues until the coil window has been filled. The laminations are transferred to the coil location by reciprocating means to be described in considerable detail below but which in general comprise a reciprocating plate mounted on a base and having a pair of lamination pickup and transfer members attached thereto. The pickup members are disposed on opposite sides of the coil member and are adapted to transfer laminations to the coil for each direction of reciprocation. Thus, when the plate is moving in one direction, the pickup member which at that time is moving toward the coil is transferring an E and an I lamination to the coil and the other pickup member is obviously moving away from the coil so as to be in position to transfer an E and an I lamination to the coil from the other side when the plate next moves in the other direction.

Figure 1:
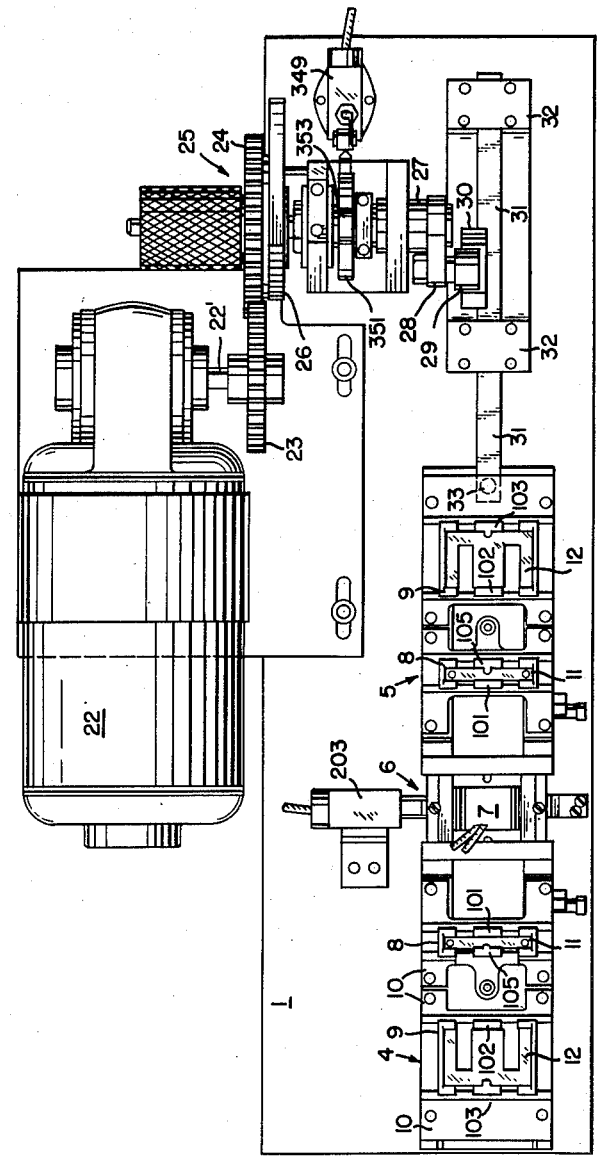
Figure 1 is a top view of a machine for assembling E and I type transformers.
Figure 2:
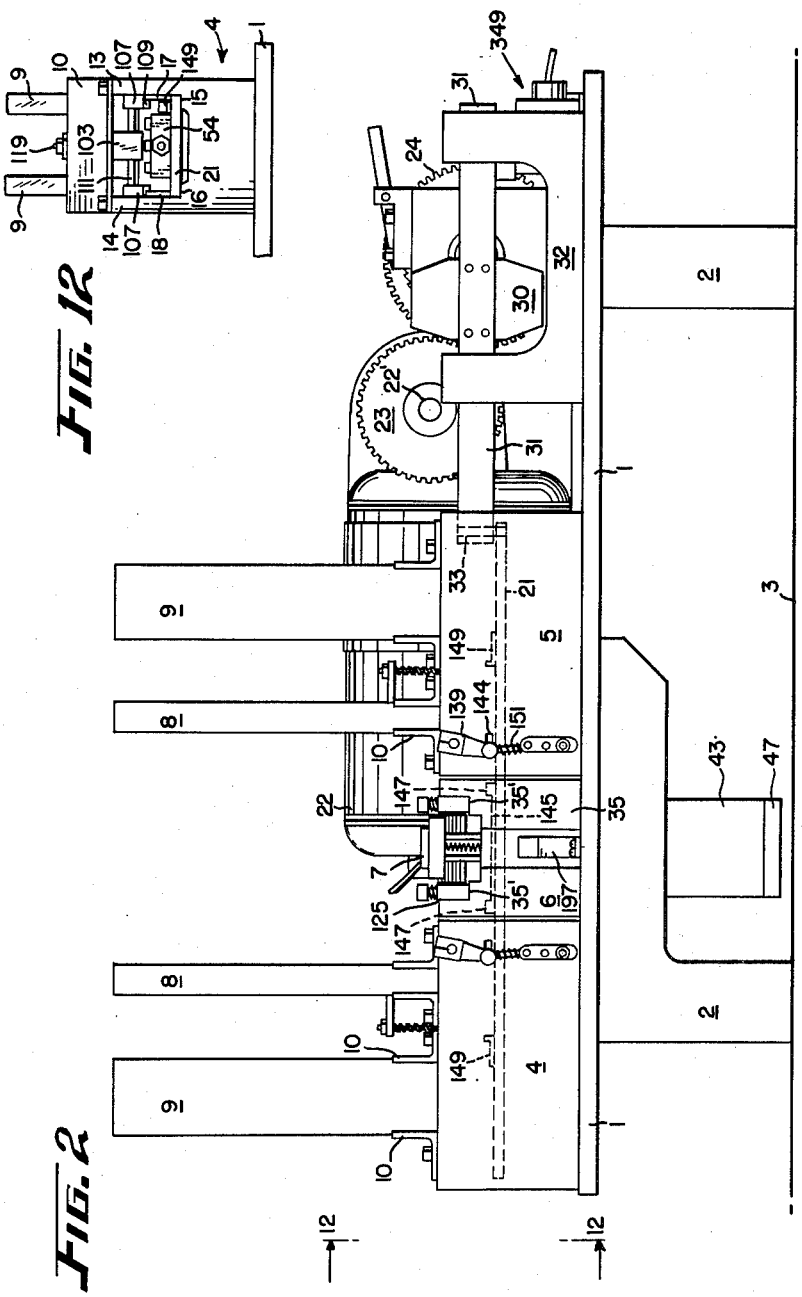
Figure 2 is a side elevational view of the machine shown in Figure 1.

Referring now to the drawings and as best shown in Figures 1 and 2, a base 1 is supported by leg members 2 on a support 3. A pair of slide plate and magazine support members 4 and 5 are secured in line with one another to the top surface of base member 1 by suitable means, not shown. Support members 4 and 5 are symmetrically disposed on opposite sides of an assembly station 6 into which are placed pre-wound coils 7 as a first step of the assembling procedure. An I magazine 8 and an E magazine 9 are mounted on top of each of support members 4 and 5 by suitable means including angle brackets 10. The I magazines 8 are intermediate the E magazines 9 and the assembly station 6. Stacks of I and E punchings or laminations 11 and 12 are contained within magazines 8 and 9 respectively.

In the description of the machine, the terms "inboard" and "outboard" will be used occasionally to aid in the description of an item. The term "inboard" will be used to indicate the item or part or portion thereof positioned closest to the assembly station 6 and conversely the term "outboard" will be used to indicate the item or part or portion thereof positioned farthest away from the assembly station.

Figure 7:
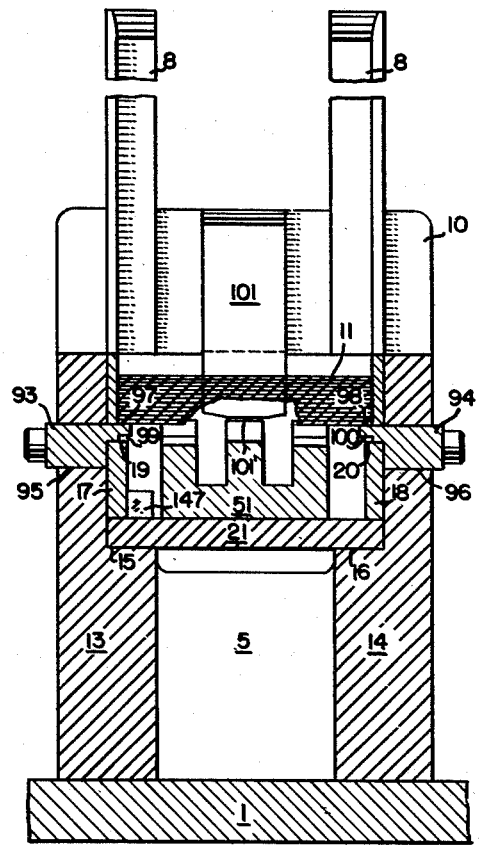
Figure 7 is a cross-sectional view of the machine showing details relating to the supporting means for the stack of I laminations, the support of the reciprocating slide plate, etc., taken along section line 7—7 of Figure 3.

As is best shown in Figures 7 and 12, each of the support members 4 and 5 has a U-shaped transverse cross section defining a pair of sides 13 and 14. Sides 13 and 14 have shoulders 15 and 16 thereon which serve as a support for a slide plate 21 which is adapted to be longitudinally reciprocated by means including a motor 22. A pair of rail or plate members 17 and 18 the same length as support members 4 and 5 are secured by suitable means not shown to the inside surface of each of sides 13 and 14 respectively above slide plate 21. The lower edge of rails 17 and 18 and shoulders 15 and 16 of sides 13 and 14 thus define the path of reciprocation of slide plate 21.

Motor 22 is of the type known as a gear motor and also has an integral electromagnetically actuated brake 22a shown schematically on Figure 13 that locks an output shaft 22' of the motor as soon as the motor is de-energized. An example of this type of motor and brake is the Master Gearmotor and Unibrake manufactured by the Master Electric Company of Dayton, Ohio.

Figure 4:
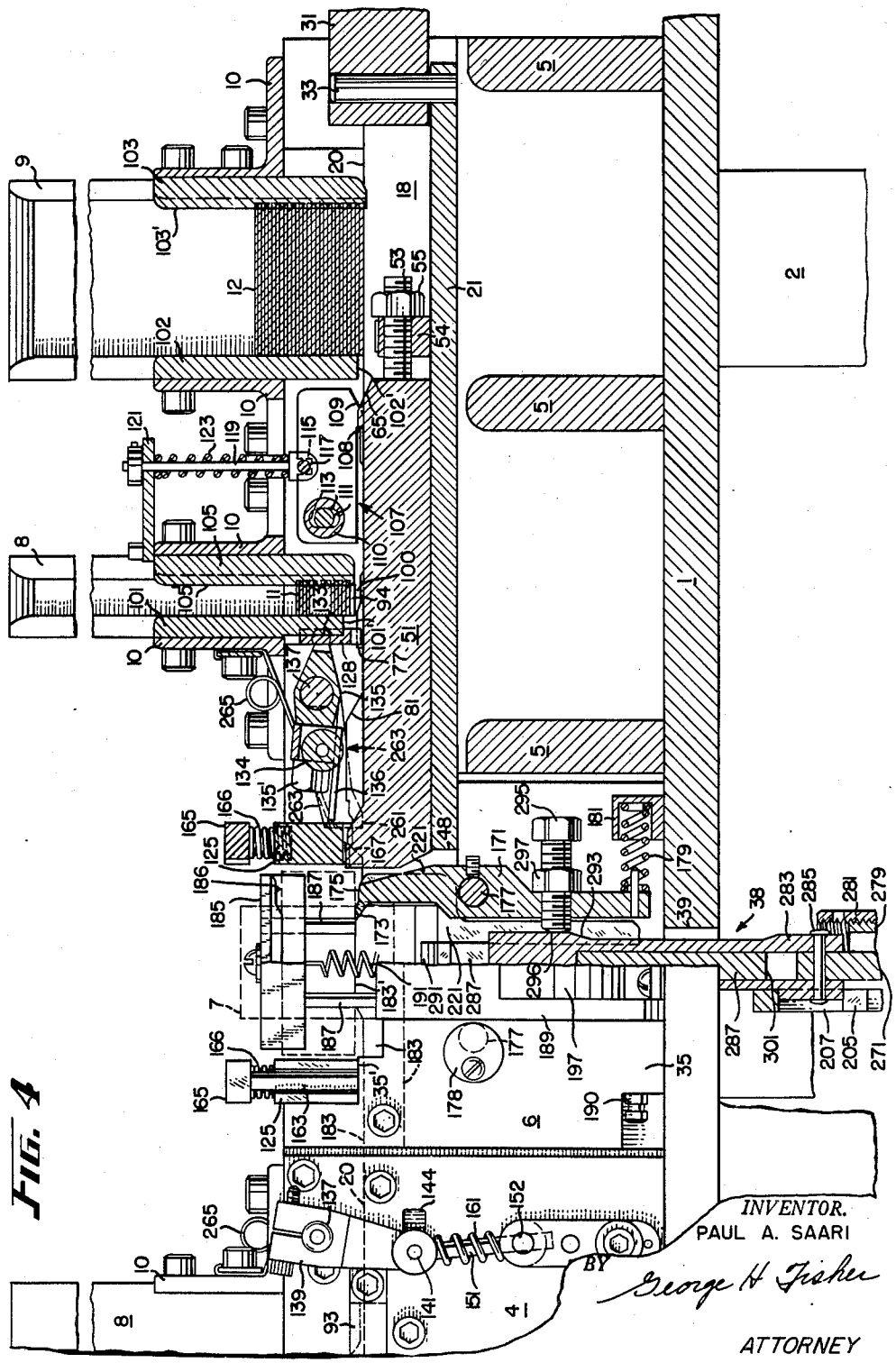
Figure 4 is a side view in cross section of the portion of the machine as shown in Figure 3 as viewed along section line 4—4 and with laminations shown in the magazine.

Motor 22 reciprocates slide plate 21 by driving from its output shaft 22' through a pair of spur gears 23 and 24, a clutch mechanism 25 including a driven member 26 secured to a driven shaft 27, a crank arm 28 secured to the end of shaft 27 and having a crank 29 at the extremity thereof, a crank follower 30, and a connection rod 31, journaled for reciprocating motion in a base 32, secured to crank follower 30, and connected at its left end as viewed in Figure 4 to slide plate 21 by pin means 33.

Assembly station 6 comprises in part a pair of side members 35 and 37, and a coil support member 38 vertically movable through an aperture 39 in base 1. The vertical elevation of support member 38 is controlled by an air cylinder assembly generally designated by numeral 41 (see Figure 5). A pair of side members 43 and 45 and a base member 47 support air cylinder assembly 41 underneath the main base 1. A centrally located aperture 48 in slide plate 21 (see Figure 5) is provided to permit the coil support member 38 to project therethrough. Aperture 48 has sufficient longitudinal extent so as to permit slide plate 21 to reciprocate without striking coil support member 38.

A pair of lamination pickup blocks 51 are secured by suitable screw means (not shown) to the top surface of slide plate 21 on opposite sides of assembly station 6 and may be adjusted with respect thereto by means of a bolt 53 threadedly supported in a lug member 54 attached to slide plate 21. A nut 55 locks bolt 53 with respect to lug 54.

Referring to Figure 8, it is seen that each lamination pickup block 51 comprises a rectangular member having two channels 57 extending the length thereof. The effect of channels 57 is to give members 51 an E-like cross section (see Figure 10). The two grooves 57 thus define three shoulders or ridges 59, 61 and 63, shoulder or ridge 61 being intermediate the two outer shoulders 59 and 63. Shoulders 59 and 63 are spaced apart a distance equal to the distance between a pair of yoke portions 12' of laminations 12 (see Figure 11). Thus, when a lamination 12 is being supported by pickup block 51, the shoulders 59 and 63 will contact the lamination 12 at yoke portions 12' and the center leg of the E lamination will be contacted by shoulder 61, the outer legs lying outside of shoulders 59 and 63. As will be seen later, the center leg of the E lamination 12 will normally be supported by shoulder 61 near the lamination's outer end 12" (see Figure 11). The extreme right edges of shoulders 59 and 63 as viewed in Figure 8 are beveled as at 65. To the left of beveled surfaces 65 are horizontal flat areas 66, and to the left thereof are further horizontal flat areas 67, the elevation of which is lower than that of areas 66 by an amount approximately equal to the nominal thickness of an E lamination 12. A pair of E pickup shoulders 68 are thus defined between flat surfaces 66 and 67. To the left of flat portions 67 on shoulders 59 and 63 for a distance approximately equal to the length of the legs of an E lamination (see Figure 11), the shoulders 59 and 63 are relieved so that portions 67 are the highest surfaces in this zone. Also in this zone shoulder 61, the center shoulder, is generally at this lower level with the exception of a flat portion 71 which is at the same level as flat portions 67 but to the left thereof a distance slightly less than the length of the legs of an E lamination.

To the left of the above described relieved portions on shoulders 59 and 63 are a second pair of inclined surfaces 73 which are immediately followed at the left thereof by a pair of flat portions 75 which are higher than the coplanar flat portions 67—67—71 and still further by lower flat portions 79 with intermediate E advance pickup shoulders 77 being defined between flat surfaces 75 and 79.

To the left of flat surfaces 79 on shoulders 59 and 63 are a third pair of inclined surfaces 81 which are followed in turn to the left by a pair of flat surfaces 83 which are higher than flat surfaces 79—79 and 75—75. Numeral 84 designates the portion of shoulder 61 which corresponds to and is lower than flat surfaces 83 as well as shoulder 71. To the left of flat surfaces 83 on shoulders 59 and 63 are still more flat surfaces 87 which are at an elevation lower than surfaces 83 by an amount approximately equal to the nominal thickness of an I lamination, I pickup shoulders 85 being defined therebetween. On the central shoulder 61 of the pickup block 51 at a point to the left of surfaces 87 slightly less than the width of an I lamination 11 and at the same elevation as surfaces 87 is a flat surface 89. To the left of flat surface 89 is another flat surface 91 at a higher elevation than surface 89 and with a beveled I pull-back surface 90 defined therebetween. To the right of flat surface 89 is a downwardly sloping surface 86 similar in pitch to inclined surfaces 81 and spaced to the left thereof by an amount approximately equal to the length of the legs of an E lamination. The left end faces of shoulders 59, 61 and 63 constitute E and I pusher surfaces 92.

As indicated above, the slide plate 21 is slidably mounted for longitudinal reciprocation on the support members 4 and 5 by being positioned between the shoulders 15 and 16 and the bottom of the rail members 17 and 18. The top surfaces of rail members 17 and 18 define a pair of shoulders 19 and 20 (see Figure 7) on which are normally supported a stack of the E laminations 12 (see Figure 4). A pair of insert members 93 and 94 extend through suitable slots 95 and 96 in the sides 13 and 14 respectively of each of support members 4 and 5 (see Figure 7). The innermost extremities of members 93 and 94 define a pair of shoulders 97 and 98 which normally support the stack of I laminations 11. It is to be noted that shoulders 97 and 98 are higher than shoulders 19 and 20 and that a pair of slots or passageways 99 and 100 are defined between shoulders 19 and 97 and shoulders 20 and 98 respectively. The purpose of this vertical displacement between the supporting means for the I laminations 11 and the supporting means for the E laminations 12 is to allow the individual E laminations to be moved toward the assembly station 6 underneath the bottom of the I lamination stack through slots 99 and 100. A gauging member 101 for gauging the I laminations 11 is adjustably secured by suitable screw means to the center outboard portion of the inboard angle bracket 10 supporting the I magazine 8 and extends downwardly along the leading or inboard edge surface of the stack of I laminations 11 in magazine 8. The lower part of the gauging member 101 is beveled in from the sides as is seen in Figures 7 and 10 defining a gauging surface 101'. Gauging member 101 is adjusted or positioned with respect to the pickup members 51 so that the lower gauging surface 101' is slightly above surface 91 on the central shoulder 61 so as to prevent contact therebetween. This spacing will also allow a single I lamination 11 engaged by the I pickup shoulders 85 to be transferred under the gauging member 101 (see Figure 14).

A gauging member 102 having a gauging surface 102' at the bottom thereof (see Figures 4 and 14 to 17) is adjustably secured to the center outboard portion of the inboard bracket 10 holding the E magazine 9. Gauging members 102 are generally the same as gauging members 101 and serve to provide a gauging means for the E laminations. Gauging members 102 are also adjusted or positioned with respect to the pickup member 51 so that the gauging surface 102' thereon will allow one and only one E lamination 12 engaged by the E pickup shoulders 68 to be transferred toward the assembly station 6 (see Figure 14). Gauging members 101 and 102 are centrally located so that gauging surfaces 101' and 102' thereon are in line with flat portions 71 and 89 on the central shoulder 61 of pickup block 51.

Figure 3:
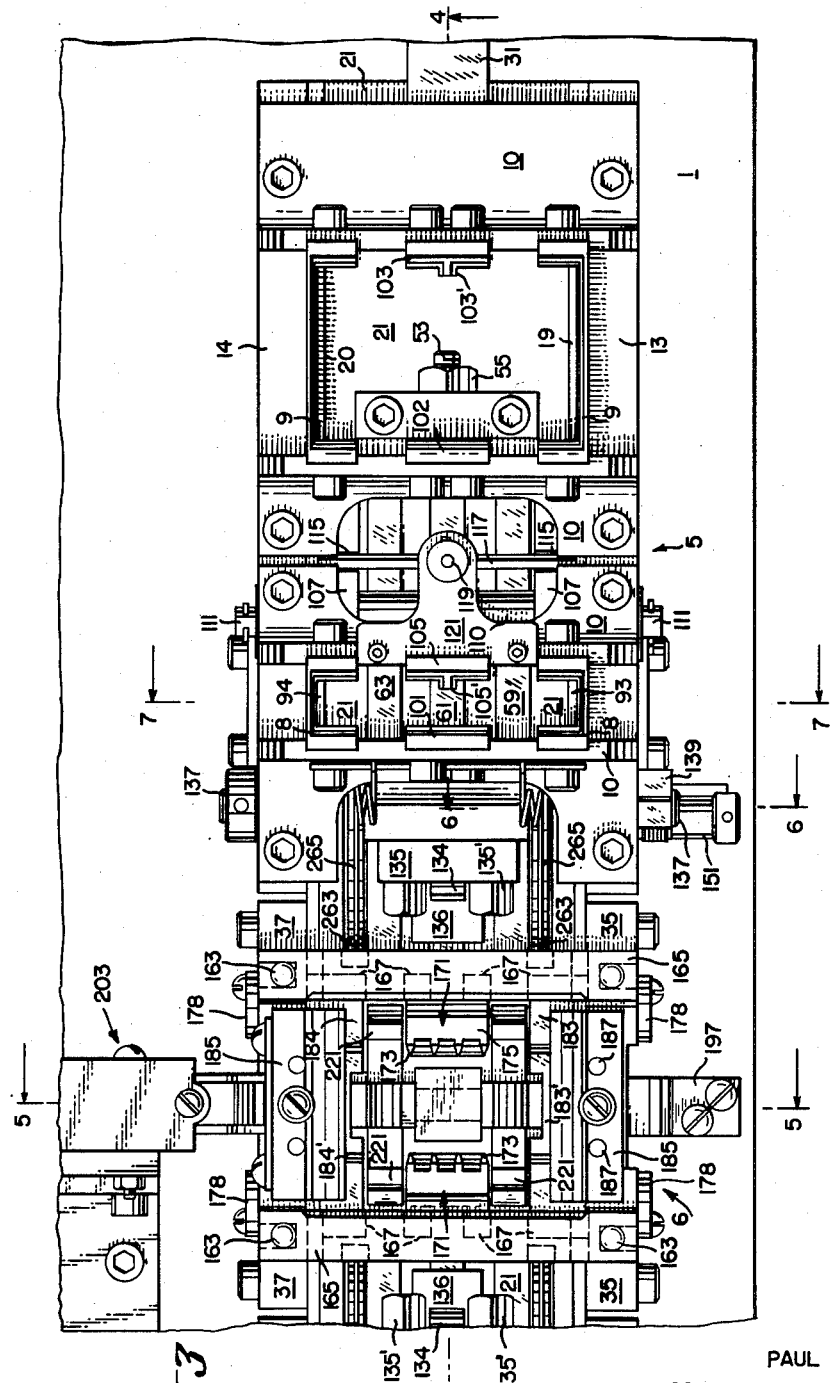
Figure 3 is a top view of a portion of the machine shown in Figure 1, on a larger scale and in greater detail, but with no laminations shown in the magazines so as to show the lamination supporting shoulders.

As shown in Figure 17 the lamination pickup block 51 is being reciprocated outboard from the extreme inboard position shown in Figures 4 and 16, the inclined surfaces 65 thereon contact the inboard edge part of the yoke portions 12' of the lowermost lamination 12 and serve to elevate it and the entire stack of E laminations. The laminations are prevented from moving outboard when being thus elevated by a backup prevention plate 103 which is attached to the center inboard portion of the outboard angle bracket 10 for magazine 9. The E backup prevention plate 103 has a lug or key portion 103' (see Figure 3) which extends inboard and cooperates with a similarly shaped recess 103'' in the outboard edge of the E laminations 12 (see Figure 11) so as to prevent the laminations from being placed in the magazines in the wrong direction. The pickup block 51 moves further outboard or to the right as viewed in Figure 4 to the extremity of its outboard travel at which position as shown in Figure 14 the E pickup shoulders 68 are slightly outboard of the outboard side of the stack of E laminations. The stack of laminations then drops down due to gravity so that the lowermost lamination 12 is supported at its yoke portions 12' on flat surfaces 67 on the outer shoulders 59 and 63 and at the inboard portion 12'' of its center leg on surface 71 of the central shoulder 61 of the pickup block 51. Thus the lowermost lamination 12 is supported at three spaced triangularly positioned areas or points. As mentioned above, the gauging member 102 is positioned so that gauging surface 102' thereon is slightly above and in line with the flat surface 71 on shoulder 61 of the pickup block 51. Also when the slide plate 21 with pickup block 51 attached thereto moves to the extreme outboard lamination supporting position, surface 71 on slide block 51 is slightly outboard from gauging surface 102' (see Figure 14). The coplanar flat surfaces 67—67 and 71 thus provide a three point support for the lowermost lamination, the point of support 71 being adjacent to the edge of the lamination closest to the assembly station and adjacent to and in line with gauging surface 102'. Therefore, even if the lamination to be transferred (the lowermost lamination) is bent or warped, it will rest on all three points 67—67 and 71 in a manner analogous to a three legged stool always remaining stable in spite of being placed on an uneven surface. It follows that since the portion 12'' of the laminations will always be resting at surface 71, that even if the lamination being transferred is bent, it will pass under the gauging surface 102' without being in conflict therewith inasmuch as gauging surface 102' is adjacent to surface 71 and is of a relatively narrow width with respect to the total width of the lamination 12. To explain further, a warped or bent lamination, whether E-shaped, I-shaped, or otherwise shaped might, due to the deformity, have an appreciable difference in elevation between one side edge and the opposite side edge. However the relatively narrow gauging surface 102' is adjacent only a small fraction of the total width of the lamination so that the variance in elevation of that fraction or portion of the lamination is proportionately smaller than the total difference between the two outside edges. Then, due to the three point support 67—67—71 of the lamination, with the "leading" or inboard point of support 71 being adjacent to and in line with the gauging surface 102', the fraction or portion of the lamination will always be at the same elevation with respect to the gauging surface 102', regardless of the type or degree of deformation. Therefore, that part of the lamination presented to the gauging surface will always be at a certain elevation and will itself have not enough deformity so as to get "hung up" on the gauge member 102 so as to jam the machine.

As the lowermost E lamination in the stack of E laminations is moved inboard toward a first intermediate F position, there is a tendency for one or more E laminations above the lowermost E lamination to move inboard also. This is due to said one or more E laminations not being engaged by E pickup shoulders 68 on pickup member 51 but rather being moved by forces transmitted thereto from the lowermost E lamination which is engaged by the E pickup shoulders 68 through burrs on the edges thereof and/or natural friction or cohesion therebetween. Such movement of said one or more E laminations is obviously undesired in order to prevent jamming and is precluded by gauging member 102 which, as indicated above, is set so that gauging surface 102' thereon allows only the lowermost E lamination abutted by pickup shoulders 68 to pass underneath. Said one or more E laminations will be restrained from moving by being abutted at the inboard edge part of their center legs by the outboard edge surface of gauging member 102. It also will be understood that gauging member 101 with gauging surface 101' thereon serves a similar function for the I laminations and allows only one I lamination 11 to be transferred at a time.

After the E lamination has passed under the gauging surface 102', and as the pickup block 51 continues moving inboard toward the assembly station, the inboard edges of the outer legs of the E lamination being transferred from its initial position strike against beveled edges 109 (see Figure 4) on the lower outboard portions of a pair of hold-back blocks 107 which are pivotally mounted on a shaft member 111 which in turn is supported by the sides 13 and 14 of support members 4 and 5 by suitable means. Hold-back blocks 107 normally rest upon shoulders 19 and 20 of plate members 17 and 18 respectively (see Figure 12). A shoulder 108 is defined on the bottom surface of hold-back blocks 107 inboard from beveled edges 109. Members 107 are provided with oblong holes 113 therein which cooperate with shaft 111 so that limited vertical movement of hold-back blocks 107 is permitted. Hold-back blocks 107 are spaced apart on shaft 111 by a hollow spacer member 110 (see Figures 3 and 4). A notch or recess 115 is provided in the top of each of hold-back blocks 107 and disposed in these recesses is a bar member 117, the center of which is attached to a vertical rod 119 which in turn extends up through a suitable aperture in a flange 121 which is secured by screw means to the outboard bracket 10 supporting the I magazine 8. A coil compression spring 123 is disposed between the underside of bracket 121 and the top of rod member 117 and is disposed around the vertical rod member 119. This arrangement serves the purpose of maintaining a downward bias on the hold-back blocks 107.

One purpose of hold-back blocks 107 is to hold the E lamination in the first intermediate E position while the pickup member 51 is moving outboard (see Figure 17). Thus the operation of the machine results in an E lamination being transferred from its initial position beneath the E magazine 9 toward the assembly station 6, traveling approximately one-third of the total distance for each reciprocation of the pickup member 51. As the E lamination in question passes under the hold-back blocks 107, as is shown in Figure 15, the latter are moved slightly upwardly (oblong holes 113 allowing this upward movement) and pivot counterclockwise as viewed in Figure 4 around shaft 111 until the E lamination advances past the beveled edges 109 to its first intermediate position at which point the downwardly biased hold-back blocks 107 move down slightly as shown in Figure 16 so that the inboard surfaces of shoulders 108 abut the outboard edge part of the E lamination thus preventing the E lamination from being moved outboard when the pickup block 51 next reciprocates outboard to pick up the next E lamination.

As the pickup block 51 moves outboard (see Figure 17), the beveled surface 73 thereon contact the E lamination in the first intermediate E position at the inboard edge parts of the bight portions 12' thereof and elevate the lamination upwardly slightly. Hold-back blocks 107 prevent outboard travel of the E laminations while being thus elevated and also resiliently hold the laminations against the pickup block 51 thus insuring that when the pickup block 51 gets to its maximum outboard position, the E lamination in the first intermediate E position will be displaced positively downward so that the outboard edge parts thereof will be in the proper position to be abutted by the intermediate E pickup shoulders 77 on the outer shoulders 59 and 63 of pickup block 51 (see Figure 14). Thus the E lamination in the first intermediate E position is positively engaged by pickup block 51 and is ready to be transferred to a second intermediate E position upon the next inboard movement of the pickup block. At approximately the same time that the E lamination in the first intermediate E position is being elevated by beveled surfaces 73 of pickup block 51, the beveled surfaces 81 on pickup block 51 are elevating the stack of I laminations 11 off of their supports 97 and 98 and as continued outboard movement of the pickup member 51 occurs, the I laminations 11 drop down and rest upon flat surfaces 87 on shoulders 59 and 63 and upon flat surface 89 on shoulder 61. Thus, at this time, the stack of I laminations is being supported entirely by the pickup block 51 and at three coplanar spaced and triangularly positioned points thereon, one of the points being under the edge of the I lamination closest to the assembly station 6 and said point being adjacent to and slightly below gauging surface 101' on the gauging member 101 described above and shown in Figures 7 and 10. Thus a means is provided for supporting, transferring, and gauging the I laminations 11 wherein jamming is precluded. The support and gauging of the I laminations is very similar to that of the E laminations since a three point support is provided for each, with a single gauging surface being provided adjacent to and in line with one of the points of support, said point being under the edge part of the laminations nearest the assembly station 6 and the other points being spaced outboard from said edge. As the beveled surfaces 81 elevate the stack of I laminations, there is a tendency to move the I laminations outboard. However, this outboard movement of the I laminations is prevented by an I backup prevention plate 105 which is secured to the center inboard portion of the outboard bracket 10 holding the I magazine 8 to the slide body 5 in a manner analogous to backup plate 103 which serves the same function for the E laminations. The I backup prevention plate 105 also has a lug or key portion 105' which cooperates with a notch or recess 105" in the I laminations so as to insure that the I laminations do not get placed the wrong way into the magazine. On the next inboard reciprocation of the pickup member 51, the E lamination in the first intermediate E position as well as the I lamination engaged by shoulders 85 adjacent to flat surfaces 87 are moved inboard, the E lamination stopping at a second intermediate E position and the I lamination being carried to the intermediate I position which is a point immediately outboard of a final gate member 125 (see Figure 4) which will be described in greater detail below. At this point, as shown in Figure 16, the E lamination in the second intermediate E position is at a lower level than the I lamination in its intermediate position with the I lamination being above and slightly inboard of the ends of the legs on the E lamination. Then the pickup member 51 is moved outboard once more. As the pickup member 51 moves outboard, the I pull-back surface 90 on shoulder 61 engages the I lamination in the intermediate I position and moves it outboard until the I lamination is almost fully above the ends of the E lamination. At the same time, this is happening, the E lamination is being engaged at its portions 12" and 12'—12' by inclined plane or cam portions 86 and 81—81 respectively of the pickup member 51. As the pickup member 51 continues to move outboard, the E lamination is displaced upwardly, remaining horizontal due to the three point camming of inclined surfaces 81—81—86. The upward camming of the E lamination tends to move it outboard, but this is prevented because the outboard edge of the E lamination is abutted against the inboard edge of a hold-back plate 128 which will be described below. As the E lamination is being lifted upwardly it soon contacts the I lamination above it at the forward extremities of its leg portions and then further elevating of the E occurs which in turn lifts the I lamination up a sufficient amount so as to disengage it from I pull-back surface 90. Thus the outboard travel of the I lamination in the intermediate I position is stopped since it is completely disengaged from pickup block 51. Pull-back surface 90 on shoulder 61 of pickup block 51 then slides under the inboard edge part of the I lamination and almost immediately contacts the inboard edge part 12″ of the center leg of the E lamination. Since the outboard edge part of the E lamination is abutted by the inboard edge of the hold-back plate 128 the E lamination can't be moved outboard by pull-back surface 90. At this point, the side edge parts parts of the I laminations above the E lamination are abutted on the top by the undersides 127′ (see Figures 6 and 19) of guide plates 127 which are fastened to the sides 13 and 14 of the support members 4 and 5 by suitable means and which will be further described below. The top surface of the I lamination is also contacted by a pair of lamination hold-down dogs 263 which have foot portions 261 and which are spring biased downwardly by springs 265 which are fastened to the inboard portion of the inboard bracket 10 holding the I magazine 8 (see Figures 4 and 19). Thus, as the beveled I pull-back surface 90 contacts the outboard edge part 12″ of the E lamination, it bows or springs the center portion of both the E and the I lamination upwardly a slight amount and the pickup block 51 continues to move outboard with respect to the laminations (see Figure 19). As the pickup block 51 moves further outboard surface 91 thereon supports the E lamination and the E lamination in turn supports the I lamination. As surface 91 moves toward the outboard edge part of lamination 12 the inboard edge part of lamination 12 begins to drop down away from the underside 127′ of guide plates 127. Since the I lamination 11 is on top of the E lamination near its inboard edge part and biased downward by dog members 263 it moves in unison with the E lamination, the spring biased dog members 263 maintaining sufficient force on the I lamination so that the I lamination will not move with respect to the E lamination. Pickup block 51 continues moving outboard until as shown in Figure 14 pusher surfaces 92 thereon are just outboard of the inboard edge part of hold-back plate 128. It is at this point that surface 91 on pickup block 51 disengages the underside of the E lamination, and as this happens a plate lifter 135 for operating hold-back plate 128 is caused to rotate counter-clockwise as viewed in Figures 4 and 14 to 17 by means which will be described below and a central plate member 136 attached to the bottom of lifter 135 contacts the top surface of the I lamination and moves both the I lamination and the E lamination positively downward until the E lamination is resting on its side edge parts partly on shoulders 19 and 20 and partly on a pair of rail members 183 and 184 which have a top surface elevation the same as shoulders 19 and 20 of plates 17 and 18 (see Figures 4, 14, and 19) and which serve as a coplanar continuation thereof. Rail members 183 and 184 are secured to sides 35 and 37 of assembly station 6 respectively by suitable screw means and have central raised flat portions 183′ and 184′ respectively as clearly shown in Figure 18 which serve as a final supporting surface for the laminations after they are pushed under final gate 125.

In addition to providing a limit for the upward displacement of the E and I laminations, guide plates 127 provide a vertical path of travel of the cam operated hold-back plate 128, the ends of which fit in slots 129 in the guide plates 127 (see Figures 9 and 19). Hold-back plate 128 serves a function analogous to that of hold-back members 107 in that it restrains outboard movement of the E lamination from its second intermediate position as pickup block 51 moves outboard just as hold-back members 107 with their shoulder portions 108 hold the E lamination in the first intermediate E position and prevent it from moving outboard as the pickup block 51 moves outboard. The hold-back plate 128 is provided with a pair of apertures 131 therein (see Figure 10) into which extend the ends 133 of the plate lifting member 135 (see Figures 4, 14 to 17, and 19) which in turn is fixed to a shaft 137 by screw means 135′, the ends of shaft 137 extending out through the sides 13 and 14 of support members 4 and 5 through suitable bearing means. When shaft 137 rotates by virtue of means to be described below, the plate lifter member 135 is also rotated thus imparting vertical motion to the hold-back plate 128. Hold-back plate 128 is positioned closely to the stationary I gauging member 101. To this end a relieved portion or notch 101″ is provided in the lower inboard edge of gauging member 101 and a notch 130 is provided in the central outboard portion of hold-back plate 128 (see Figures 9 and 10). Hold-back plate 128 has three further notches 132 on the lower surface thereof (see Figures 10 and 19) each of which are wider than shoulders 59, 61 and 63 of pickup block 51 and are spaced from one another so as to register with said shoulders 59, 61, and 63. This arrangement allows the hold-back plate 128 to be lowered a considerable distance without actually engaging the pickup member 51 and this provides positive hold-back of the E lamination in the second intermediate E position when the pickup block 51 is moving outboard.

The means for rotating shaft 137 and hence the hold-back plate lifting member 135 include a lever member 139 (see Figures 4 and 6) clamped to the extended portion of shaft member 137 by screw means and extending downwardly, supporting at its lower end a pin member 141 which is normal to the main axis of lever member 139 and which has an inner end 142 which extends through a rectangular aperture 144 in the side of the support members 4 and 5 and an outer end 143 extending outwardly from lever member 139. An apertured end of another lever member 151 is loosely positioned on the outwardly extending end 143 of pin member 141, the other end of lever member 151 extending downwardly into a loose fitting socket member 152 which in turn is loosely held in suitable recesses by a pair of cooperating plate members 153 and 154. Plate members 153 and 154 are secured to sides 13 of support members 4 and 5 and positioned with respect thereto as well as being held together by screw means 155 and pin members 156 and 157. Positioned between the top of socket member 152 and the apertured headed portion of lever member 151 is a spring member 161 which serves to bias pin member 141 to one side or the other of slot member 144 in an overcenter fashion, pin member 141 pivoting about loosely positioned socket member 152. The effect of this is to give positive action to the vertical reciprocation of hold-back plate 128 so that the latter tends to be in either a full upward or a full downward position. When the pickup block 51 is in the extreme outboard position and begins to move inboard, the hold-back plate 128 is in the upper position so as to allow the E laminations in the first intermediate E position to be transferred toward the second intermediate E position as well as to allow the I lamination to be transferred from its initial position below the I magazine 8 to its intermediate position. As the pickup block 51 continues to move inboard toward the assembly station the top part of pusher surface 92 on the central shoulder 61 thereof strikes the bottom surface of a roller member 134 (see Figures 3, 4, 14 to 17, and 19) journaled by suitable means in the hold-back plate lifter 135. This causes plate lifter 135 to rotate clockwise as viewed in Figure 4 and thus displace hold-back plate 128 downwardly. However, the hold-back plate 128 is prevented from being moved to its lowest position because its lower surface is abutted against the top of the E lamination being transferred from the first intermediate E position to the second intermediate E position. Thus the hold-back plate 128 at this point tends to hold the E lamination resiliently down against surfaces 79—79 of slide block 51 so as to assure positive transfer thereof. After the E lamination clears the hold-back plate 128, then the latter is moved to its lowest position by the overcenter action described above and also by the inwardly extending portion 142 of pin 141 being contacted and moved to its full inboard position by a trip bar member 149 fastened to the top surface of slide plate 21 (see Figure 2). The trip bar 149 thus assures that the hold-back plate 128 will be displaced to its full lower position and thus preclude the E lamination in the second intermediate E position from being moved outboard as the pickup block 51 moves outboard on the next reciprocation. The hold-back plate 128 is lifted as the slide plate 21 moves outboard when a central trip bar 145 secured thereto having two trip surfaces 147 thereon (see Figure 2) contacts the inwardly extended end 142 of pin member 141. Trip bar 145 is positioned centrally on slide plate 21 intermediate trip bars 149 and in line therewith (see Figures 2, 5 and 12) and is proportioned and located so that it strikes end 142 of pin 141 and thus causes hold-back plate lifter 135 to be rotated counterclockwise (as viewed in Figure 4) just as the E lamination in the second intermediate E position is being disengaged from surface 91 on pickup block 51. This causes, as has been described above, the plate member 136 attached to lifter 135 to positively displace the E lamination in the second intermediate E position as well as the I lamination in the intermediate I position (on top of the E lamination) downwardly against the outboard ends of the top surfaces of rail members 183 and 184 and the inboard ends of shoulders 19 and 20 on plate members 17 and 18. Final gate members 125 are loosely mounted for vertical displacement on vertical rods 163, the top extremities of which are secured to and connected by a cross bar 165. A pair of coil springs 166 are disposed between the underside of cross bar 165 and suitable recesses in the top of final gate members 125 so as to normally bias the latter downward. Final gate members 125 abut at their bottom ends against stepped portions 35' of side plate 35 of assembly station 6 (see Figure 4). Similar steps (not shown) are provided in side plate 37. The portions of final gate members 125 lying between side plates 35 and 37 are partially relieved on the lower outboard edge thereof leaving beveled surfaces 167 which slope upwardly and away from the assembly station (see Figures 3, 4, 14 to 17, and 18). When the pickup block 51 begins to move from its extreme outboard position toward the assembly station (see Figure 14), the pusher surfaces 92 thereon contact the outboard edge part of the E lamination in the second intermediate E position and begin to move it toward the assembly station. The I lamination in the intermediate I position on top of the E lamination also begins to move but is held back momentarily by the beveled surfaces 167 on final gate 125 (this is because the I lamination is, at this point, near the inboard edge part of the E lamination and hence is not receiving positive movement from pusher surfaces 92) (see Figure 15). The inboard edge parts of the legs of the E lamination 12 strike the beveled surfaces 167 on the final gate member 125 and elevate the latter up enough, against biasing springs 166, so as to allow the E lamination to pass underneath. After passing under final gate 125, the inboard edge parts of the outside legs of the E lamination contact the beveled outboard portions of surfaces 183' and 184' on rails 183 and 184 and the inboard edge part on the center leg of the E lamination strikes a beveled toothed surface 175 on a coil locater member 171 which will be described in greater detail below. As the pickup block 51 moves further toward the assembly station, the pusher surfaces 92 thereon finally engage the I lamination and force it out underneath final gate member 125 so that it comes to rest (see Figure 16) on top of the E lamination with notches 105" and 103" (see Figure 11) in register with one another, and with both of the laminations properly positioned with respect to the coil. As shown in Figures 4 and 14 to 18 each coil locater 171 has a top toothed portion 173 which is adapted to fit inside the window of the coils. Toothed portions 173 are beveled as shown with inboard and outboard camming surfaces thereon. Thus, when an E lamination is being pushed into the assembly station and the center leg has passed through the window of the coil, the edge part of the center leg contacts the inboard camming surface on the toothed portions 173 which causes the E lamination to be slightly elevated. This of course occurs almost at the end of the pushing stroke and the E lamination comes to rest with the edge part of the center leg slightly outboard from the highest point or ridge of the toothed surface 173 of the coil locater (see Figure 16 and note the bottom lamination at the assembly station). Then, when the next E lamination is pushed into the assembly station the inboard edge of the center leg thereon contacts the outboard camming surfaces on the toothed portions 173 which together with (as above indicated) the beveled outboard portions of surfaces 183' and 184' on rails 183 and 184 cam the inboard end of the lamination up so that it positively enters the window of the coil. During the camming the inboard edges of the E lamination being transferred contact the underside of the E lamination last inserted into the coil and slides underneath it (see Figure 15), the above described overlap between the ridge on toothed surface 173 and the inboard edge of the E lamination in the final position insuring that the laminations will always slide under one another and not abut endwise against one another which would cause jamming of the mechanism. The coil locaters 171 are fixed to transverse rod members 177 which are journaled in the sides 35 and 37 of the assembly station 6 and are retained in position by cap members 178 which are fastened to sides 35 and 37 of assembly station 6 by suitable screw means (see Figures 3 and 4). The lower extremity of each of the coil locaters 171 is abutted by one end of a spring member 179 the other end of which fits in a suitable recess in a lug member 181 fastened to base 1. Spring members 179 normally bias the coil locaters out of engagement with the coils 7. However, when the coil support mechanism 38 is in the lower position as shown in Figures 4 and 5, the coil locaters 171 are rotated into engagement with the coils by the following means including the air cylinder assembly 41 which comprises an output shaft or ram 271 which is adapted to be vertically displaced from its lower position as shown in Figure 5 upwardly by suitable piston means (not shown) contained within a piston housing 273. The vertical position of the piston and hence the shaft 271 is controlled by a lift coil 275 and a drop coil 277, which are shown schematically on Figure 13 and which are remote from piston housing 273. Coils 275 and 277 control a suitable valve (not shown) which in turn controls the flow of air or other suitable fluid to the piston.

A boss portion 279, externally threaded, extending up from the top surface of piston housing 273 surrounds shaft member 271. A coil locater operating member 283 is connected to shaft member 271 by pin means 285. Member 283 is shaped generally like an inverted U with its leg portions straddling a main coil support member 287, the bight portion of member 283 being disposed in a suitable recess 289 in support member 287 (see Figure 5). The top surface of support member 287 is curved as at 291 so as to receive initially the curved exterior lower surface of a coil 7. The legs of coil locater operating member 283 are relieved at their midportions, which defines two beveled shoulders 293 near the top thereof (only one shown in Figure 4). A bolt member 295 is threaded into a suitable aperture in coil locater member 171 and is adapted to be locked with respect thereto by a jam nut 297. A rounded end portion 296 of bolt 295 is adapted to bear against the leg portions of the coil locater operating member 283. As shown in Figure 4, the rounded end portion 296 of bolt member 295 is in contact with the bight portion of member 283 and hence coil locater member 171 is rotated counterclockwise on shaft 177 a maximum amount against the biasing restraint of spring member 179 so as to allow the toothed portions 173 to project inside the window of coil 7. After the transformer has been stacked, means, which will be described below, stop the reciprocating of slide plate 21, and cause the piston output shaft or ram 271 to be elevated. This in turn moves coil locater operating member 283 upwardly so that the rounded end portion 296 of bolt 295 is in contact with the relieved portion of member 283. As this happens, spring 179 causes coil locater 171 to rotate clockwise as seen in Figure 4 a sufficient amount so as to disengage teeth 173 from the window opening of coil 7.

As the laminations are fed into the window of coil member 7, the side edges of the E laminations are resiliently held between the top surfaces 183' and 184' of rail members 183 and 184 and the under surfaces 186 of overhanging portions on a pair of hold-down clamps 185 (see Figures 4 and 5). As will be noted in Figure 4, the under surfaces 186 on hold-down clamps 185 are similarly shaped in a reverse sense to the top surface of rail members 183 and 184. This facilitates the insertion of the laminations into the assembly station 6. Clamps 185 are secured to the extremities as by staking of rod members 187 which in turn are journaled for vertical displacement in a pair of support members 189 pivotally mounted at their lower portions about shafts 190 which in turn are secured in sides 35 and 37 of assembly station 6. Extension coil spring members 191 fastened between the hold-down clamps 185 and the lower portion of support members 189 bias the hold-down clamps 185 downwardly toward the top surface of members 189. Members 189 have inwardly extending portions 193 (see Figure 5) which have beveled portions 194 thereon which are adapted to be met by complementary beveled surfaces 299 on the coil support plate member 287 so that when the latter member is in its lowest position, the members 189 with their associated hold-down clamps 185 will be disposed towards the center of the assembly station but when the coil support plate 287 is elevated as when the coil has been filled with laminations and is ready to be extracted from the machine, the members 189 with their hold-down clamps will be disposed outwardly from the center of the assembly station 6 so as to disengage hold-down clamps 185 from the edges of the transformer. Spring means 197, the lower extremities of which are attached to the base member 1 bear against the sides of members 189 so as to normally maintain them towards the center of the assembly station. It will be noted that when output shaft 271 of the air cylinder assembly 41 is in its lowest position as shown in Figures 4 and 5 the top of shaft 271 is spaced below the bottom 301 of coil support member 287. This arrangement allows shaft 271 to be displaced upwardly by the piston means through this lost motion distance before any contact therebetween is made. At the same time coil locater operating member 283 is being positively elevated by shaft 271. This causes the coil locaters 171 to disengage the coil 7 before any upward motion is imparted to the assembled transformer and thus precludes any injury to the coil. After the completed transformer has been removed from the machine, another coil 7 is placed upon top of the coil support member 287 and the latter member is lowered to the position shown in Figures 4 and 5. Initially the lower curved surfaces on the coils 7 are disposed on the curved surfaces 291 of coil support member 287, but, as laminations are fed into the coil, each E lamination sliding underneath the preceding E lamination, the coil 7 is gradually elevated upwardly so that it no longer is supported by the coil support member 287, but is supported by the laminations which in turn rest on surfaces 183' and 184' of rails 183 and 184 as is shown in Figure 5.

A bracket member 199 is secured as viewed in Figure 5 to the right hold-down clamps 185 and has a lower portion 201 thereof extending normal thereto, which portion is adapted to actuate a switch 203 when the hold-down clamps are in a maximum upper position, this position being equivalent to the correct number of laminations within the window of a coil 7. It will be appreciated that as the stack of laminations grows, the vertical elevation of hold-down clamps 185 is increased.

A lever member 205, pivotally supported within a suitable aperture 206 in side bracket 45 of the air cylinder supporting means, has one end extending within the air cylinder support chamber and is adapted to be abutted at said end by a bracket member 207 which in turn is fastened by suitable means to one of the legs of coil locater operating member 283 (see Figures 4 and 5). The opposite end of the lever member 205 is adapted, when displaced upwardly, to contact a switch member 211 which will be described below in connection with the schematic diagram. Aperture 206 in side member 45, provides a limit of travel for lever 205. Thus, when the shaft member 271 operated by the piston means is displaced to its lowest position as shown in Figure 5, switch 211 is actuated by lever 205.

Secured to the top portion of coil support member 287 are four lamination stabilization members 221 (see Figures 3, 4, 5 and 18). Members 221 are fastened two on each side to coil support member 287 and spaced apart so as to be adjacent to rail members 183 and 184 and on opposite sides of the coil locater members 171 (see Figures 5 and 18). The top surfaces of members 221 are at the same elevation generally as the beveled surfaces 175 on coil locater members 171. The purpose of members 221 is to define, along with curved surfaces 291 on coil support member 287, a definite recess for initially positioning the coil member 7 and also to assist in the stabilization of the laminations during the assembly of the transformer. Thus the laminations are supported, in the assembly station, by surfaces 183' and 184' on rails 183 and 184, respectively, and to a lesser extent by the top surfaces of members 221. To explain further, as a lamination is being inserted into the window of a coil 7, there is a tendency for the coil to rock or pivot about the rail members 183 and 184. This rocking is precluded by the laminations being contacted at their extremities by the top surfaces of members 221, it being appreciated that such rocking would be adverse to proper positive operation of the assembly apparatus.

Referring to Figure 13, the electrical schematic diagram for the control of this apparatus, it is seen that motor 22 is of a split phase, alternating current type having a condenser 22b in series with one winding thereof and is adapted to be energized from a source of alternating current, not shown, through a pair of connection leads 331 and 333 and through a set of normally open relay contacts 335 adapted to be actuated by a relay 337. One side of the coil for relay 337 is connected to lead 333. The other connection lead for the coil of relay 337 is connected to one of the contacts of the switch 211 which, as indicated above, is controlled by the vertical position of the coil locater actuating member 283 operating through lever member 205. Switch 211 is in the open position at all times except when member 283 is in the extreme lower position as shown in Figures 4 and 5. The other connection point of switch 211 is connected to one side of a normally open start switch 339 the other side of which in turn is connected in series with one side of another normally open start switch 341 the other side of which is connected to lead 331. The drop valve coil 277 is connected between a junction 343 which is between start switches 341 and 339 and connection lead 333. A switch 349 operated by a cam portion 353 on a cam member 351 (see also Figure 1) and a normally open set of contacts 347 also operated by relay 337 are connected in series between line 331 and a junction point 345 which is between start switch 339 and coil support switch 211. Cam member 351 is secured to shaft 27 of the driving mechanism for slide plate 21 and is adapted to trip or actuate switch 349 once for each revolution of shaft 27. Thus, the contacts of switch 349 are normally closed but are opened once for each revolution of shaft 27. Stack switch 203 is shown to be a single pole, double throw switch having a common terminal 355 connected to lead 331 as well as having a terminal 357 connected to a junction point 359 intermediate of switch 349 and relay contacts 347. A second contact of stack switch 203, contact 361, is connected to a normally closed set of contacts 363 of relay 337. Contacts 363 in turn are connected to one side of the lift valve coil 275, the other side of which is connected to the main connection lead 333. Stack switch 203 is shown in its normal or unoperated condition, namely having circuit continuity between the common terminal 355 and terminal 357. Stack switch 203 is adapted, when tripped by portion 201 of lever member 199, to break the circuit between points 355 and 357 and establish a circuit between points 355 and 361. The circuit diagram for this apparatus is better understood by following through a cycle of operation. Assuming that the machine has just completed stacking a transformer and that the operator has removed the completed transformer from the assembly station 6, the coil support mechanism will be in its upper position. Switch 211 will be open and thus relay 337 will be deenergized. A new coil is then placed in the machine and the operator depresses both start switches 339 and 341. This completes a circuit from lead 331 through start switch 341 and the drop valve coil 277 to the other main connection lead 333. This actuates the piston within piston housing 273 so that it is displaced downwardly lowering the coil locator actuating member 283 and the coil support member 287, as well as the coil 7. When the coil locater actuating member 283 gets to its lowest position member 207 thereon engages lever member 205 and trips the coil support switch 211 thus completing a circuit for relay 337. Energization of relay 337 closes the normally open contacts 335 thus completing an energization circuit for the motor 22 and brake coil 22a. Motor 22 then begins to rotate so as to reciprocate slide plate 21 and thus feed laminations into the window of the coil member 7. At the same time a holding circuit for relay 337 is completed through coil support switch 211, junction point 345, relay contacts 347 (which are now closed), junction point 359, switch 203 (through contacts 357 and 355) to connection lead 331. Thus the start switches 339 and 341 may be released by the operator. Also when relay 337 is energized the normally closed contacts 363 in series with the lift valve coil 275 are opened. It will be understood that for each reciprocation of slide plate 21, switch 349 is opened but that this does not deenergize relay 337 inasmuch as switch 349 is shunted by switch 203. When the machine is operated long enough so that the window of coil 7 is completely full of laminations, the stack switch 203 is tripped by lever 199 thus breaking the circuit between points 355 and 357 and establishing a circuit between points 355 and 361. Then the next time switch 349 is opened by the cam portion 353 on cam member 351, relay 337 will be deenergized which in turn opens contacts 335 deenergizing the motor 22. The brake within motor 22 controlled by brake coil 22a then stops the reciprocation of slide plate 21. The cam portion 353 on cam member 351 and the brake in motor 22 are coordinated so that slide plate 21 will be stopped in a position such as is shown in Figure 4 where the pickup block 51 has just completed inserting a lamination into the coil. This arrangement precludes the possibility of a lamination being only partially inserted into the coil when the machine stops. When relay 337 is deenergized, the normally closed contacts 363 regain their closed condition thus completing a circuit from connection lead 331 to point 355 of stack switch 203, to contact 361 of stack switch 203, contacts 363 and lift valve coil 275 to the other main connection lead 333. Thus lift valve coil 275 is energized which causes the piston member within piston housing 273 to be displaced upwardly. The upward displacement of the piston output shaft 271 first disengages the coil locaters 171 from the coil, then displaces hold-down clamps 185 out away from the laminations and elevates the completed transformer upwardly so as to allow removal thereof from the machine.

It should be appreciated that each time the slide plate 21 with the pickup blocks 51 secured thereto moves from the outboard position toward the assembly station 6 an E and an I lamination are brought to the assembly station. Simultaneously an E lamination is moved from its initial position on the bottom of the stack of E laminations in the magazine 9 to the first intermediate E position; the E lamination in the first intermediate E position is moved to the second intermediate E position; an I lamination is moved from its initial position on the bottom of the stack of I laminations in magazine 8 to the intermediate I position; and the E lamination in the second intermediate E position and the I lamination in the intermediate I position are moved into the assembly station 6 under final gate member 125. Thus, as slide plate 21 moves to the left as shown in Figure 4, the pickup block 51 shown in Figure 4 moves an E and an I lamination into assembly station 6 from the right. As slide plate 21 then moves to the right from the position shown in Figure 4, the other pickup block 51 on the opposite side of assembly station 6 moves an E and an I lamination into assembly station 6 from the left and so on back and forth until the window in coil 7 is filled with laminations.

Advantages of this invention, in addition to the unique three point support of the laminations during the gauging process, include the arrangement whereby the relative velocity between the laminations being transferred and the pickup block 51 is zero or very near so at the instant the contact therebetween is effected. Thus the lamination pickup shoulders 68, 77 and 85 as well as pusher surfaces 92 on pickup block 51 are so positioned with respect to the laminations in their initial and intermediate positions that the laminations are engaged thereby immediately as soon as the pickup block is moved inboard by the slide plate 21. This precludes any high velocity impacts of the laminations by the pickup block which impacts in and by themselves tend to cause the laminations to jump or bounce out of correct position and jam up the machine. Another advantage of this invention is the stabilizing effects imposed on the laminations during transfer by the hold-back blocks 107, the hold-back plate 128, and the spring-biased hold-down dogs 263 which serve to hold the laminations down resiliently against pickup block 51 when the latter is moving inboard.

While I have shown and described a specific embodiment of this invention, further modifications and improvements will occur to those skilled in the art. For example, while pickup shoulders 68, 77 and 85 have been described to be of a sufficient height so as to engage only one E or I lamination as the case may be, it will be appreciated that these surfaces could be redesigned so as to engage more than one lamination and correspondingly, the gauge members 101 and 102 would be displaced upwardly a sufficient amount so that their lower gauging surfaces 101' and 102', respectively, would allow the passage therethrough of the increased number of laminations. Therefore, I desire it to be understood that this invention is not to be limited to the particular form shown and I intend in the appended claims to cover all modifications which do not depart from the spirit and scope of the invention.

What I claim is:

1. In a machine for assembling E and I shaped core lamination punchings with coil means for electromagnetic induction apparatus: the combination of a base; an assembly station centrally located on said base; magazines for E and I punchings on said base on opposite sides of said station; stacks of E and I punchings in said magazines; the magazines for the I punchings being intermediate the magazines for the E punchings and said station; means on said base below said magazines for supporting said stacks, said supporting means being so positioned so as to hold the bottom of the stacks of said I punchings at a higher elevation than the stacks of the E punchings; a plate slidably mounted on said base; means for reciprocating said plate longitudinally with respect to said base; a pair of punching pickup and transfer members on said plate, said transfer members being reciprocated between a zone adjacent to said station and a zone below said magazines; two sets of inclined planes on each of said members for elevating said stacks away from said supporting means when said members are moving outboard from said station; means secured to said base and positioned adjacent to said stacks of punchings to prevent said punchings from being moved outboard from said station when said stacks are being elevated; two sets of three coplanar, spaced, and triangularly located areas on each of said members with each of said sets of areas being adjacent to and at a lower elevation than the highest portions of said sets of said inclined planes, E and I pickup shoulders being defined between said highest portions and said areas, and one of the areas in each set of areas being closer to said station than the other areas in its respective set; and gauging means on said base adjacent to each of said magazines and in line with said ones of said areas.

2. In a machine for assembling E and I shaped core laminations with conductive winding means for electromagnetic induction apparatus: the combination of a base; an assembly station on said base, E and I magazines containing E and I laminations respectively mounted on said base, said I magazines being intermediate said assembly station and said E magazines; a slide plate on said base; means for reciprocating said plate; a pair of lamination pickup blocks on said slide plate; each block having inclined plane means thereon and a set of three spaced and triangularly located points for supporting said E laminations and a set of three spaced and triangularly located points for supporting said I laminations, the first named set of three points being at a lower elevation than the second named set of three points and one point of each of said sets of three points being inboard from the other points of its respective set of points, gauging means mounted on said base adjacent to each magazine and in line with said ones of said points; means including said sets of points on said blocks for transferring E and I laminations in successive steps toward said station said laminations being moved to an intermediate position where one of said laminations is disposed over and vertically spaced from the other lamination; and means including said inclined plane means for elevating said other lamination until it abuts against the underside of said one of said laminations and disengages said one of said laminations from said slide block.

3. In a machine for assembling lamination punchings with prewound coil means into electromagnetic induction apparatus: the combination of a base; an assembly station on said base; a magazine mounted on said base and spaced from said station; a plurality of lamination punchings in said magazine; means on said base below said magazine for supporting said punchings, a punching pickup and transfer member, means for reciprocating said pickup member relative to said base between a zone adjacent to said station and a zone below said magazine; inclined plane means on said pickup member for elevating said punchings away from said supporting means when said pickup member is moving outboard from said station; means on said base to prevent said punchings from being moved outboard from said station when said punchings are being elevated; a set of three coplanar, spaced, and triangularly located points on said pickup member, one of said points being inboard from said other points; and gauging means on said base in line with said ones of said points and adjacent to said one of said points when said punchings have been elevated.

4. In a device for assembling laminated cores, a base, an assembly station on said base, a magazine containing lamination punchings mounted on said base, means on said base for supporting said lamination punchings, means including a movable member slidably mounted on said base for moving punchings from said magazine inboard in successive steps toward said assembly station, means on said movable member for disengaging said lamination punchings from said supporting means and supporting said lamination punchings at three spaced and triangularly located points, one of said points being under the inboard edge of said punchings and the other of said points being outboard from said one of said points, and a gauging member on said base and positioned adjacent to and in line with said one of said points when said stack is disengaged.

5. In apparatus for assembling laminated cores, a base, an assembly station on said base, means on said base for supporting a plurality of lamination punchings reciprocating means movably mounted on said base for moving selected punchings from said plurality of punchings inboard toward said assembly station, means on said reciprocating means for disengaging said plurality of lamination punchings from said supporting means and supporting said plurality of punchings at three spaced and triangularly located points, one of said points being under the central inboard edge of said punchings, and the other of said points being outboard from said one of said points and on opposite sides thereof, and a single gauging member mounted on said base adjacent to the center inboard edge of said plurality of punchings.

6. In apparatus for assembling a plurality of two differently shaped core laminations with prewound conductive winding means so as to form electromagnetic induction apparatus: the combination of a base; an assembly station on said base; magazines mounted on said base and containing stacks of said core laminations, the magazine for laminations of one shape being intermediate said station and the magazine for laminations of the other shape; slidable means on said base; means for reciprocating said slidable means; lamination pickup means on said slidable means, said pickup means having inclined plane means thereon; means including said pickup means for transferring individual laminations in successive steps toward said station, said laminations being moved to an intermediate position where a lamination of one shape is disposed over and spaced from a lamination of the other shape, the lower lamination then being raised by said inclined plane means until it abuts against the underside of the upper laminations and disengages said upper lamination from said pickup means; means restraining said lower lamination from moving outboard while it is being raised; means resiliently holding said upper lamination against said lower lamination upon said upper lamination being abutted by said lower lamination; means for supporting said laminations upon the disengagement of said laminations by said pickup means when said pickup means moves outboard away from said station; means effective when said pickup means nears its outboard extremity of travel to disengage said restraining means and to displace said resiliently held laminations positively against said supporting means; and means including said pickup means on its next inboard reciprocation for transferring said resiliently held laminations to said assembly station.

7. In apparatus for assembling a plurality of core laminations of a first shape and a plurality of core laminations of a second shape with prewound conductive winding means so as to form electromagnetic induction apparatus, the combination of: a base; an assembly station on said base; means on said base containing stacks of said core laminations, the containing means for the laminations of said first shape being intermediate said assembly station and the containing means for the laminations of said second shape; means on said base for supporting said stacks, said laminations of said first shape being supported at a higher elevation than said laminations of said second shape; reciprocal means slidably mounted on said base for transferring selected laminations from said stacks in successive steps to said assembly station, said laminations of said second shape being transferred from an initial position at the bottom of said stack of laminations of said second shape to a first intermediate position, thence under said supporting means for said stack of laminations of said first shape to a second intermediate position, and thence to a final position in said assembly station, and said laminations of said first shape being transferred from an initial position at the bottom of said stack of laminations of said first shape to an intermediate position and thence to a final position in said assembly station, said laminations of said first shape in the intermediate position being above and spaced from the laminations of said second shape in the second intermediate position; means on said reciprocal means for elevating said laminations of said second shape in said second intermediate position so as to abut and disengage said laminations of said first shape in said intermediate position from said reciprocal means; means for preventing said laminations of said second shape from being transferred outboard during the outboard reciprocation of said reciprocating member away from said station; means for preventing relative motion between said laminations of said first shape in the intermediate position and the laminations of said second shape in the second intermediate position when said latter laminations abut said former laminations; means for supporting said abutted laminations; means controlled by said reciprocal means for positively displacing said abutted laminations toward said last named supporting means as said laminations of said second shape in the second intermediate position are disengaged by said reciprocal means; and means on said reciprocal means for transferring said abutted laminations to said assembly station.

8. In apparatus for assembling electromagnetic induction apparatus: a base; an assembly station on said base; magazines for core punchings on said base on opposite sides of said assembly station; means including reciprocating means for transferring punchings in successive steps from said magazines to said assembly station; motor means on said base connected by rotating means to said reciprocating means; means effective upon deenergization of said motor means to stop said reciprocating means; coil supporting means on said base in said assembly station; means for lifting said coil supporting means to an upper coil receiving and finished induction apparatus discharging position; means for lowering said coil supporting means to a lower lamination punching receiving position; means including a pair of start switches and means actuated by said coil supporting means in said lower position for energizing said motor; means connecting said lowering means and one of said start switches in circuit so that actuation of said one of said start switches lowers said coil supporting means to said lower lamination punching receiving position, said motor then becoming energized so as to cause said reciprocating means to transfer lamination punchings to said assembly station; means shunting said start switches after said motor is energized including means responsive to the energization of said motor and switch means actuated by cam means on said rotating means, said cam actuated switch means being actuated at least once for each reciprocation of said reciprocating means and related to said stopping means so that said reciprocating means is stopped at an extremity of travel; means responsive to the height of the stack of lamination punchings transferred to said assembly station for shunting said cam actuated switch means until a predetermined stack height has been reached at which point said cam actuated switch is effective to deenergize said motor means; and means including said stack responsive means and means responsive to the deenergization of said motor means for actuating said lifting means so as to raise said coil supporting means to said upper finished induction apparatus discharging position when said stack reaches said predetermined height and said motor has become deenergized.

9. In apparatus for gauging a lamination from a stack of laminations; movable means adapted to move laterally the bottom lamination from said stack of laminations to a zone remote from said bottom of said stack, said movable means including vertical surface means for abutting the outboard edge of said bottom lamination and imparting an inboard motion to said bottom lamination; support means for supporting said stack of laminations as said bottom lamination is being abutted by said vertical surface means, said support means including only three spaced and triangularly located lamination supporting points with one of said points being under the central inboard edge of said stack of laminations and with the other two points of said three points being outboard from said one of said points; gauging means comprising only a single relatively narrow member positioned inboard of and immediately adjacent to the central inboard edge of said stack of laminations and having a bottom horizontal gauging surface vertically spaced above said one of said supporting points by a predetermined amount; means positioning said movable means, said support means, and said gauging means in operative relationship; and means for moving said movable means.

10. In apparatus for gauging laminations from the bottom of a stack of laminations; movable means adapted to move laterally laminations from the bottom of said stack of laminations to a zone remote from said bottom of said stack, said movable means including vertical surface means for abutting the outboard edge of said laminations and imparting an inboard motion to said laminations; support means for supporting said stack of laminations as said laminations are being abutted by said vertical surface means, said support means including only three spaced and triangularly located points with one of said points being under the inboard edge of said stack of laminations and with the other two points of said three points being under the outboard edge of said stack of laminations; gauging means comprising only a single relatively narrow member positioned inboard of and immediately adjacent to said one of said points when said stack of laminations is supported by said three points and having a bottom horizontal gauging surface vertically spaced above said one of said supporting points by a predetermined amount; means positioning said movable means, said support means, and said gauging means in operative relationship; and means for moving said movable means.

11. In apparatus for gauging a lamination from a stack of laminations; movable means adapted to move laterally the bottom lamination from said stack of laminations to a zone remote from said bottom of said stack, said movable means including vertical surface means for abutting the outboard edge of said bottom lamination and imparting an inboard motion to said bottom lamination; support means for supporting said stack of laminations as said bottom lamination is being abutted by said vertical surface means, said support means including only three spaced and triangularly located lamination supporting points with one of said points being under the inboard edge of said stack of laminations and with the other two points of said three points being outboard from said one of said points; gauging means comprising only a single relatively narrow member positioned inboard of and immediately adjacent to said one of said supporting points and having a bottom horizontal gauging surface vertically spaced above said one of said supporting points by a predetermined amount; means positioning said movable means, said support means, and said gauging means in operative relationship; and means for moving said movable means.

12. In apparatus for gauging a lamination from a stack of laminations; movable means adapted to move laterally the bottom lamination from said stack of laminations to a zone remote from said bottom of said stack, said movable means including vertical surface means for abutting the outboard edge of said bottom lamination and imparting an inboard motion to said bottom lamination; support means on said movable means for supporting said stack of laminations as said bottom lamination is being abutted by said vertical surface means, said support means including only three spaced and triangularly located points with one of said points being under the inboard edge of said stack of laminations and with the other two points of said three points being under the outboard edge of said stack of laminations; gauging means comprising only a single relatively narrow member positioned inboard of and immediately adjacent to said one of said points when said stack of laminations is supported by said three points and having a bottom horizontal gauging surface vertically spaced above said one of said supporting points by a predetermined amount; means positioning said movable means, and said gauging means in operative relationship; and means for moving said movable means.

References Cited in the file of this patent

UNITED STATES PATENTS

| | | |
|---|---|---|
| 1,161,581 | Anderson | Nov. 23, 1915 |
| 1,301,685 | Graham | Apr. 22, 1919 |
| 1,493,480 | De Tour | May 13, 1924 |
| 1,966,878 | Bluzat | July 17, 1934 |
| 2,154,855 | Lear | Apr. 18, 1939 |
| 2,494,349 | Mittermaier | Jan. 10, 1950 |
| 2,522,316 | Steiner | Sept. 12, 1950 |

FOREIGN PATENTS

| | | |
|---|---|---|
| 660,322 | Great Britain | Nov. 7, 1951 |